United States Patent
Huang et al.

(10) Patent No.: US 7,333,678 B1
(45) Date of Patent: Feb. 19, 2008

(54) EDGE ADAPTIVE DEMOSAIC SYSTEM AND METHOD

(75) Inventors: Qifan Huang, Sunnyvale, CA (US); Li Sha, San Jose, CA (US)

(73) Assignee: Micronas USA, Inc., Santa Clara, CA (US)

( * ) Notice: Subject to any disclaimer, the term of this patent is extended or adjusted under 35 U.S.C. 154(b) by 770 days.

(21) Appl. No.: 10/850,778

(22) Filed: May 20, 2004

Related U.S. Application Data

(60) Provisional application No. 60/472,177, filed on May 20, 2003.

(51) Int. Cl.
G06K 9/32 (2006.01)
G06K 9/36 (2006.01)
H04N 3/14 (2006.01)

(52) U.S. Cl. .................. 382/300; 382/293; 382/276; 348/272; 348/273

(58) Field of Classification Search ............... 382/300; 348/272, 273
See application file for complete search history.

(56) References Cited

U.S. PATENT DOCUMENTS

| | | | | |
|---|---|---|---|---|
| 5,373,322 A | * | 12/1994 | Laroche et al. | 348/273 |
| 5,631,703 A | * | 5/1997 | Hamilton et al. | 348/273 |
| 6,181,376 B1 | * | 1/2001 | Rashkovskiy et al. | 348/273 |
| 6,781,626 B1 | * | 8/2004 | Wang | 348/273 |
| 7,088,392 B2 | * | 8/2006 | Kakarala et al. | 348/272 |
| 7,256,828 B2 | * | 8/2007 | Nilsson et al. | 348/273 |

* cited by examiner

*Primary Examiner*—Jingge Wu
*Assistant Examiner*—José M Torres
(74) *Attorney, Agent, or Firm*—Mayer Brown LLP

(57) ABSTRACT

A demosaic system and method that supports multiple CFA pattern inputs is disclosed. The demosaic system is capable of handling both RGB Bayer input and CMYG input and perform demosaic operations on both inputs to recover full-color images from the raw input images. The system uses a variable number gradient demosiac process. The process uses a 5×5 neighborhood of sensor pixel data centered at the pixel under consideration. The process calculates a set of gradients corresponding to different directions within the neighborhood of the sensor pixel data. A threshold value is determined and a subset of gradients is selected from the set of gradients that fall below the threshold value. The system calculates estimation values for the missing color value and the actual measured center pixel color value obtained from the sensor data on directions that are within the subset of gradients below the threshold. The system then determines the sum of the missing color estimation values and the sum of the actual center pixel color estimation values. The system interpolates the missing color value by using the average difference of the summed estimation values for the missing color and the summed estimation values for the actual center measured pixel value from the sensor data.

22 Claims, 9 Drawing Sheets

| G1  | B2  | G3  | B4  | G5  |
|-----|-----|-----|-----|-----|
| R6  | G7  | R8  | G9  | R10 |
| G11 | B12 | G13 | B14 | G15 |
| R16 | G17 | R18 | G19 | R20 |

Figure 1

| C1  | M2  | C3  | M4  | C5  |
|-----|-----|-----|-----|-----|
| Y6  | G7  | Y8  | G9  | Y10 |
| C11 | M12 | C13 | M14 | C15 |
| Y16 | G17 | Y18 | G19 | Y20 |

Figure 2

| Gb | B | Gb | B | Gb |
|----|---|----|---|----|
| R  | Gr| R  | Gr| R  |
| Gb | B | Gb | B | Gb |
| R  | Gr| R  | Gr| R  |
| Gb | B | Gb | B | Gb |

| Gb | B | R | Gr |
|----|---|---|----|

Figure 6A

| Gr | R  | Gr | R  | Gr |
|----|----|----|----|----|
| B  | Gb | B  | Gb | B  |
| Gr | R  | Gr | R  | Gr |
| B  | Gb | B  | Gb | B  |
| Gr | R  | Gr | R  | Gr |

| Gr | R | B | Gb |
|----|---|---|----|

Figure 6B

| R  | Gr | R  | Gr | R  |
|----|----|----|----|----|
| Gb | B  | Gb | B  | Gb |
| R  | Gr | R  | Gr | R  |
| Gb | B  | Gb | B  | Gb |
| R  | Gr | R  | Gr | R  |

| R | Gr | Gb | B |
|---|----|----|---|

Figure 6C

| B  | Gb | B  | Gb | B  |
|----|----|----|----|----|
| Gr | R  | Gr | R  | Gr |
| B  | Gb | B  | Gb | B  |
| Gr | R  | Gr | R  | Gr |
| B  | Gb | B  | Gb | B  |

| B | Gb | Gr | R |
|---|----|----|---|

Figure 6D

| C | M | C | M | C |
|---|---|---|---|---|
| Y | G | Y | G | Y |
| C | M | C | M | C |
| Y | G | Y | G | Y |
| C | M | C | M | C |

| C | M | Y | G |
|---|---|---|---|

Figure 7A

| G | Y | G | Y | G |
|---|---|---|---|---|
| M | C | M | C | M |
| G | Y | G | Y | G |
| M | C | M | C | M |
| G | Y | G | Y | G |

| G | Y | M | C |
|---|---|---|---|

Figure 7B

|   |   |   |   |   |
|---|---|---|---|---|
| Y | G | Y | G | Y |
| C | M | C | M | C |
| Y | G | Y | G | Y |
| C | M | C | M | C |
| Y | G | Y | G | Y |

| Y | G | C | M |
|---|---|---|---|

Figure 7C

|   |   |   |   |   |
|---|---|---|---|---|
| M | C | M | C | M |
| G | Y | G | Y | G |
| M | C | M | C | M |
| G | Y | G | Y | G |
| M | C | M | C | M |

| M | C | G | Y |
|---|---|---|---|

Figure 7D

| $A_{i-2,j-2}$ | $B_{i-2,j-1}$ | $A_{i-2,j}$ | $B_{i-2,j+1}$ | $A_{i-2,j+2}$ |
|---|---|---|---|---|
| $C_{i-1,j-2}$ | $D_{i-1,j-1}$ | $C_{i-1,j}$ | $D_{i-1,j+1}$ | $C_{i-1,j+2}$ |
| $A_{i,j-2}$ | $B_{i,j-1}$ | $A_{i,j}$ | $B_{i,j+1}$ | $A_{i,j+2}$ |
| $C_{i+1,j-2}$ | $D_{i+1,j-1}$ | $C_{i+1,j}$ | $D_{i+1,j+1}$ | $C_{i+1,j+2}$ |
| $A_{i+2,j-2}$ | $B_{i+2,j-1}$ | $A_{i+2,j}$ | $B_{i+2,j+1}$ | $A_{i+2,j+2}$ |

Figure 8

EDGE ADAPTIVE DEMOSAIC SYSTEM AND METHOD

CROSS-REFERENCE TO RELATED APPLICATION

This application claims priority to U.S. Provisional Patent Application No. 60/472,177 filed on May 20, 2003, which is incorporated herein by reference in its entirety.

BACKGROUND OF THE INVENTION

I. Field of the Invention

The present invention relates generally to video processing, and more specifically to edge adaptive interpolation of Bayer patterns.

II. Description of the Related Art

The increase popularity of digital cameras for still images and motion pictures has resulted in great advances in digital imaging and video processing. An active area of investigation is in CFA (color filter array) recovery methods. In some digital cameras such as those using charge coupled device (CCD) sensors or Metal Oxide Semiconductor (CMOS) sensors, a single sensor is used to sub-sample an image into three color planes, RGB (Red, Green, and Blue). The use of a single sensor provides an economical and practical way to obtain the three primary colors from an image. In order to capture the three color intensities on a single sensor, a color filter array is used to break the sensor into a mosaic of red, green and blue pixels, as illustrated in FIG. 1. In such a case, the original image is captured with each raw image pixel composed of only one primary color intensity component: either R, G, or B. However, for rendering display, it is desirable to recover a full-color image, where each pixel is composed of a combination of R, G and B color components, from the raw image. Methods to recover full-color images are commonly referred as demosaicing.

A demosaic operation converts a raw image acquired with a single sensor array, overlaid with a color filter array, into a full-color image. "Demosaicing" typically involves interpolating missing color components for a pixel by estimating their values from neighboring pixels. Many demosaic process are specifically targeted at a class of CFA patterns known as Bayer patterns with RGB color space. FIG. 1 is an illustration of a Bayer pattern. This pattern alternates a row of B and G filters with a row of R and G filters. The Bayer pattern makes use of the fact that the human eye is more sensitive to green, and thus more surface of the CFA is used for this color to represent high-frequency detail. The combination of the primary color R, G and B is sufficient to reproduce most colors for visual perception.

Other CFA patterns can also be used to filter light on a sensor. Another popular CFA is the CMYG filter, in which cyan (C), magenta (M), yellow (Y), and green (G) filters are used. FIG. 2 is an illustration of a CMYG CFA pattern.

Many conventional demosaicing approaches exist for converting a raw image data obtained from an RGB Bayer CFA pattern to a full-color image. A simple demosaicing process involves assigning the value of the nearest pixel (any one of the upper, lower, left or right pixel) in the input image as the missing color components. Another approach known as bilinear interpolation involves averaging surrounding pixels to obtain the missing color components for each pixel location. For example, to interpolate green pixels, average the upper, lower, left and right pixel values; thus, according to FIG. 1, the green value for pixel 8 (G8)=(G3+G13+G7+G9)/4. Missing values for red and blue pixels are similarly estimated as linear combinations of available red and blue sensor responses, respectively. However, these approaches are typically prone to undesirable color edge artifacts such as blurring.

Methods to improve color edge artifacts use adaptive color plane interpolation. In one such prior art method used for RGB. Bayer CFA, a set of gradients is determined from the color values in a 5×5 neighborhood centered at the pixel under consideration. Each gradient corresponds to a different direction. For each set of gradients, a threshold value is determined, and the threshold is used to select a subset of gradients. Low-valued gradients indicate pixels having similar color values whereas high-valued gradients would be expected in regions of image where there are many fine details or sharp edges. The subset of gradients is used to locate regions of pixels that are most like the pixel under consideration. The pixels in the region are then weighted and summed to determine the average difference between the color of the actual measured center pixel value and the missing color.

The above adaptive demosaic approach offers good results for sharp edges for RGB Bayer CFA. However, to apply the above demosaic approach to a non-RGB Bayer pattern, the pattern would need to be first converted to an RGB Bayer input pattern. This requires added computational complexity. Thus, there is a need for an edge adaptive demosaic system and method that offers improved edge sharpness and less false color for RGB and non-RGB Bayer CFA input patterns and that does not require conversion to an RGB color space. In particular, there is a need for an edge adaptive demosaic operation that inherently supports CMYG CFA input patterns.

SUMMARY OF THE INVENTION

The above needs are met by a system and method that supports both RGB Bayer CFA and CMYG video CCD sensors without the need for conversion from one color space to another. The present invention provides a demosaic system and method that supports multiple input CFA patterns.

The demosaic system of the present invention is capable of handling both RGB Bayer input and CMYG input and perform demosaic operations on both inputs to recover full-color images from the raw input images. The system uses a variable number gradient demosiac process. The process uses a 5×5 neighborhood of sensor pixel data centered at the pixel under consideration. The process calculates a set of gradients corresponding to different directions within the neighborhood of the sensor pixel data. A threshold value is determined and a subset of gradients is selected from the set of gradients that fall below the threshold value. The system calculates estimation values for the missing color value and the actual measured center pixel color value obtained from the sensor data on directions that are within the subset of gradients below the threshold. The system then determines the sum of the missing color estimation values and the sum of the actual center pixel color estimation values. The system interpolates the missing color value by using the average difference of the summed estimation values for the missing color and the summed estimation values for the actual center measured pixel value from the sensor data.

The features and advantages described in the specification are not all inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

The accompanying drawings illustrate several embodiments of the invention and, together with the description, serve to explain the principles of the invention.

FIG. 1 illustrates a conventional RGB Bayer pattern.

FIG. 2 illustrates a conventional CMYG pattern.

FIGS. 6A-6D shows the various representations of an RGB bayer pattern.

FIGS. 7A-7D shows the various representations for a CMYG pattern.

FIG. 8 illustrates a 5×5 matrix mapping of a CFA pattern sensor data with the colors represented as A, B, C and D.

DETAILED DESCRIPTION OF THE INVENTION

A preferred embodiment of the present invention is now described with reference to the figures where like reference numbers indicate identical or functionally similar elements. Also in the figures, the left most digit of each reference number corresponds to the figure in which the reference number is first used.

In a preferred embodiment, the present invention operates within an image input processor (IIP) 300, the IIP 300 takes in raw images from sensors such as CCD sensors or CMOS sensors (not shown) and performs demosaic operation on the raw images to convert them to full-color images. The IIP 300 also performs color space conversion to convert CMYG or RGB color space into YUV video images. The IIP 300 outputs a YUV 4:2:2 (UYVY) video format. In one implementation, the output of the IIP 300 is coupled to a video input processor (VIP). A more detailed description of an image input processor and functionality in addition and ancillary to the present invention is disclosed in the commonly-assigned copending U.S. patent application Ser. No. 10/210,254, now U.S. Pat. No. 7,142,251, filed on Jul. 31, 2002 and entitled "Video Input Processor in Multi-Format Video Compression System," by Li Sha, et al., the subject matter of which is herein incorporated by reference in its entirety.

Note that in describing other video formats, the YUV video format is frequently mentioned and used throughout this specification. It is common knowledge that YUV is a video color model in which luminance information (Y) is separated from chrominance information (U and V). Such YUV video components are often represented in a variety of ways: (1) Y, R-Y, B-Y; (2) $YC_rC_b$ and (3) $YP_dP_b$, etc. Moreover, YUV formats fall into two distinct groups: (1) the packed formats where Y, U and V samples are packed together into macropixels; these macropixels are stored in a single array; and (2) the planar formats where each component is stored as a separate array, the final image being a fusing of the three separate planes. The popular UYVY format is a packed YUV 4:2:2 format, in which the luminance component (Y) is sampled at every pixel, and the chrominance components (U and V) are sampled at every second pixel horizontally on each line. The following description of YUV video should be understood as applied to all compatible and derivative digital video formats.

In addition, the specification also makes frequent references to raw image data or sensor image data, such as sensor CMYG image data or raw RGB image data. The two terms as used in the specification refer to image data that have not been converted to full-color image through a demosaic process. A raw or sensor image is still in its original format as captured on a CCD or CMOS sensor using CFA to separate color information into a mosaic pattern as illustrated in FIGS. 1 and 2.

Figure 3:
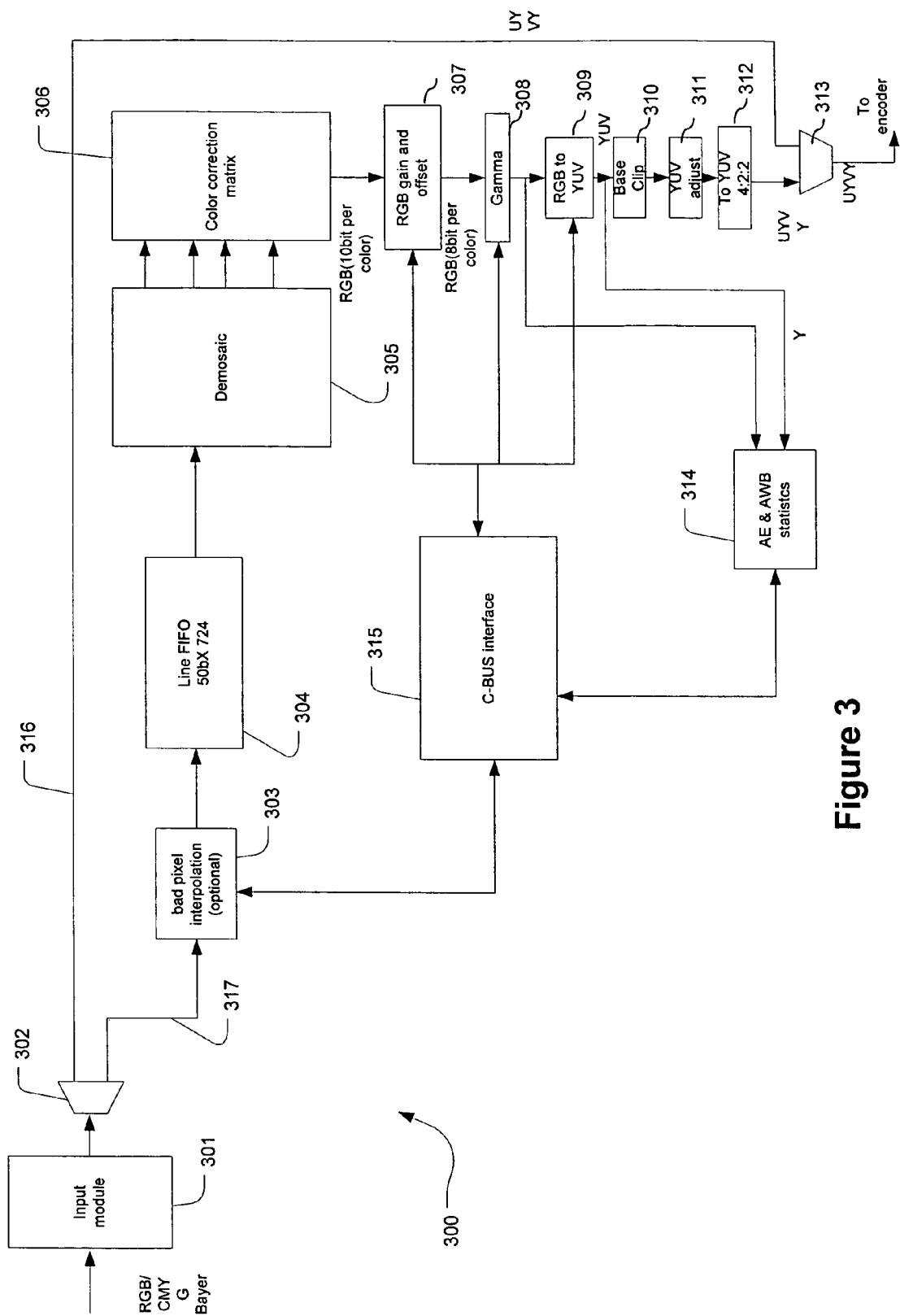
FIG. 3 is a high-level block diagram of an input image processor used in accordance with the present invention.

FIG. 3 illustrates an image input processor 300 that may be used to implement the image input processing system in accordance with one embodiment of the present invention. The IIP 300 includes an input module 301 that is capable of handling raw sensor data in a variety of format such as CMYG or RGB Bayer image data, or YUV format image data. The input module 301 upgrades pixel bit depth to 10 bits. Logic unit 302 determines whether the input is a YUV image data 316 or a sensor CMYG or RGB Bayer image data 317. Logic unit 302 also acts as a multiplexer to pass the data from the input module 301 onto signal line 316 or 317. YUV format image data 316 does not require any demosaicing and are thus passed right to the video input processor (VIP) unit via multiplexor 313.

The IIP unit 300 may optionally include a bad pixel interpolation (BPI) module 303 to correct bad pixel values in the CCD or CMOS image data by interpolating between neighboring pixels. In one embodiment, the BPI module 303 supports up to 32 bad pixels. The BPI module 303 is also coupled to the C-Bus interface 315, and the bad pixel address table can be read and written by the host system. The output of the BPI module 303 is the corrected pixel, which is queued in the line FIFO buffer 304. The demosaic module 305 takes the pixel values from the FIFO buffer 304 and performs advance adaptive demosaic operations to convert the raw pixel data into full-color image pixel values. The demosaic operation inherently supports CMYG sensor image data and RGB Bayer sensor image data.

After the pixel image data have been converted to full-color pixel image data, the color correction matrix 306 performs color space conversion to convert the full-color pixel image data from the CMYG color space to the RGB color space. The color correct matrix 306 performs the CMYG to RGB color space conversion through a linear transformation operation, by applying a 4×3 matrix to the CMYG color values. The color correction matrix 306 eliminates cross talking of color filters on sensors (not shown). In an embodiment, the matrix coefficients are programmable from −511/256 to 511/256.

The output of the color correction matrix 306 is coupled to the RGB gain and offset module 307. This module 307 provides gain and offset adjustments for white balance. In an embodiment, gains are programmable from 1023/256 to 1/256, and offsets are programmable from −127 to +127. The outputs are also divided by 4 (right shifted by 2 bits) and clipped to a 0-255 range. Thus, the 10-bit RGB pixel depth is converted back to an 8-bit RGB pixel depth per color.

The RGB gamma correction module 308 takes the output of the RGB gain and offset module 307 and performs gamma correction by using three separate gamma correction curves for RGB channel. Gamma correction transforms linear-light intensity to a nonlinear video signal. In an embodiment, three gamma correction curves are programmable and customizable by using nine triples $(x_i, y_i, c_i)$. Each triple represents a linear segment. $x_i$ is one of {0, 4, 8, 16, 32, 48, 128, 192}. $y_i[7:0]$ is the corresponding output value at $x_i$. $c_i[7:0]$ is the slope of this linear segment. The output $y=y_i+(c_i*(x-x_i))/16$ where $x_i<x<x_{i+1}$.

The RGB to YUV module 309 takes the output of the RGB gamma correction module 308 and performs a CCIR601 (Consultative Committee for International Radio, now ITU-R) standard color space conversion:

$$Y=(66*R+129*G+25*B)/256+16$$

$$B-Y=(-38*R-74*G+112*B)/256$$

$$R-Y=(112*R-94*G-18*B)/256$$

B-Y and R-Y are clipped to a range of −127 to +127

Next, the base clip module 310 takes the output of the RGB to YUV module 309 and adjusts the saturation:

$$(B-Y)'=SAT*(B-Y)$$

$$(R-Y)'=SAT*(R-Y)$$

The base clip module 310 reduces the chromatic signal level in low saturation, i.e., when both |R-Y| and |B-Y| are less than a given threshold. The base clip module 310 has four strength levels:

0: No base clip
 1: Reduce chromatic signals to half
 2: Reduce chromatic signals to quarter
 3: Reduce chromatic signals to zero The YUV adjustment module 311 provides contrast and brightness control and hue adjustment to the output of the base clip module 310. The adjustments are controlled as follows:

$$Y'=contrast*Y+brightness$$

$$Cr=(R-Y)*\cos(\theta)+(B-Y)*\sin(\theta)+128$$

$$Cb=(B-Y)*\cos(\theta)-(R-Y)*\sin(\theta)+128$$

The range of θ is from −31° to +31° in steps of one degree. Values for contrast ranges from 128/64 to 1/64.

The YUV to YUV 4:2:2 module 312 sub-samples the chroma components from the YUV adjustment module 311 horizontally by a factor of two. Thus, U and V samples are taken for every second pixel across a line. The input YUV format is compressed to UYVY format, which is a YUV 4:2:2 packed where Y, U and V samples are packed together into an array of macropixels. In a UYVY format, the U and V components are horizontally sub-sampled by a factor of two, and the luma component is conveyed in full detail. This compression technique exploits the human eyes' poor visual acuity to color. The conversion takes $Y_1U_1V_1$ and $Y_2U_2V_2$ and sub-samples that to $UY_1VY_2$, where $U=(U_1+U_2)/2$ and $V=(V_1+V_2)/2$.

The output of the YUV to YUV 4:2:2 module 312 is coupled to an input multiplexor 313 which provides the output of the IIP 300 responsive to a control signal based on whether the input was CMYG or RBG Bayer pattern.

The AE and AWB statistics module 314 takes a scene and divides it up into a center area and a background area. The size of the center area is programmable and customizable. This module 314 calculates the following statistical data of both the center and background areas:

Average Y (A black point and a white point are given. Only the pixels with value between them will be counted.),
Maximal Y,
Minimal Y,
Average R, G, B (A black point and a white point are given, only the pixels with value between them will be counted.),
Maximal R, G, B,
Minimal R, G, B, The AE and AWB module 314 takes RGB component values from the output of gamma correction module 308. It is also coupled to the output of RGB to YUV conversion module 309 and receives the luma component from that module 309.

In the above embodiment of the present invention, bad pixel interpolation module 303, RGB gain and offset module 307, gamma correction module 308, RGB to YUV conversion module 309, and AE and AWB statistics module 314 are all coupled to C-Bus interface 315.

The output of the AE and AWB module 314 is sent to an encoder such as a VIP unit. Logic unit 313 selects the output of the AE and AWB module 314 or UYVY signal 316 as the output of the IIP unit 300.

The above descriptions of the IIP 300 are provided for enablement and to explain the context in which the present invention preferably operates. The above descriptions are an exemplary overview of functionality, coupling and structure. As has been noted above, more detail can be found in the co-pending U.S. patent application Ser. No. 10/210,254, which is incorporated herein by reference.

Figure 4:
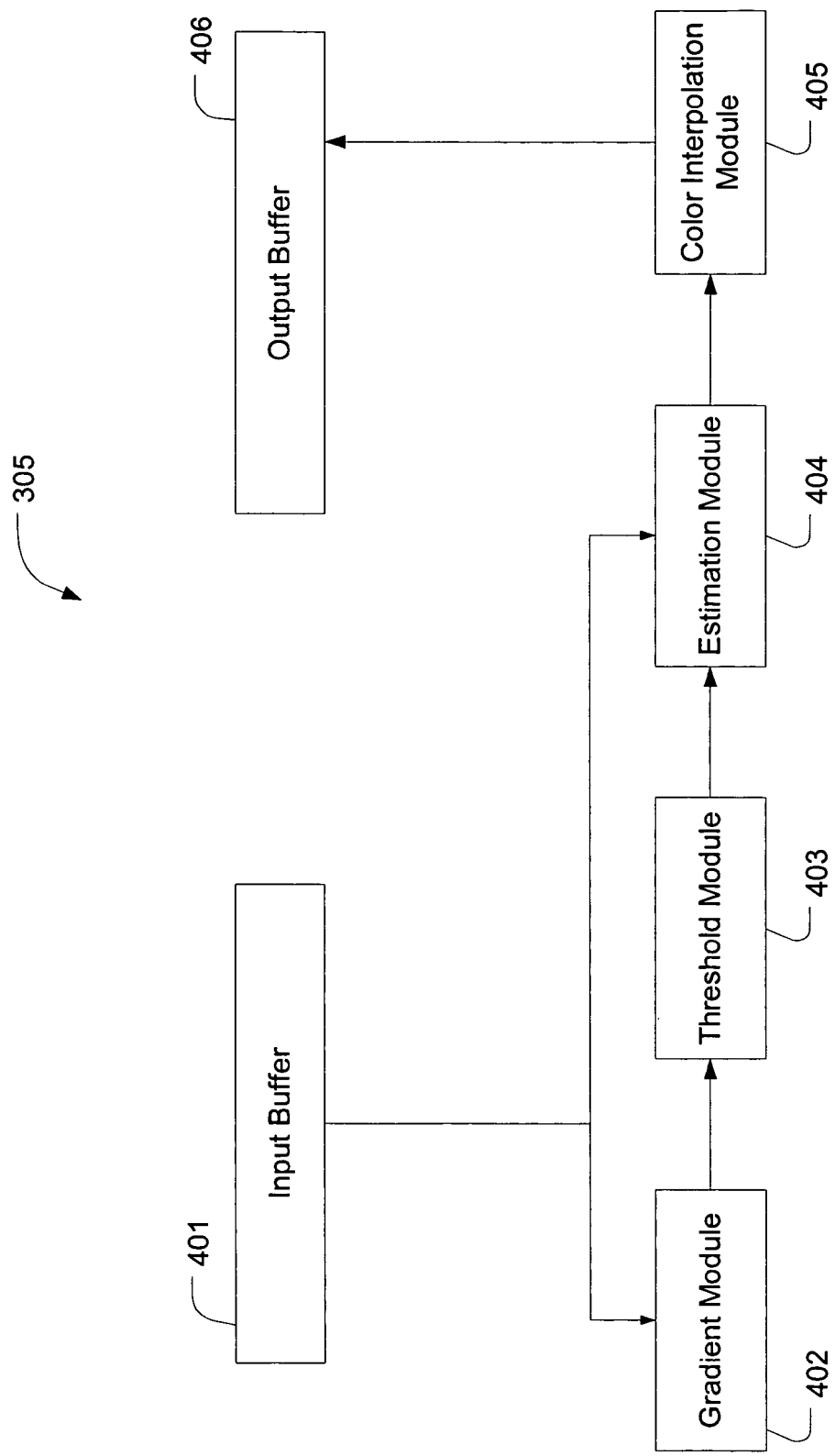
FIG. 4 is a block diagram illustrating a more detailed view of a demosaic module shown in FIG. 3.

The demosaic module 305 is illustrated in more detail in FIG. 4. The demosaic module 305 processes sensor images obtained from CFA patterns using a variable number gradient demosiac process to get improved sharpness and less false colors.

The demosaic module 305 comprises of an input buffer 401 for holding CFA color pixel data. In the preferred embodiment, the input module 401 holds a 5×5 neighborhood of CFA pixel data centered at the pixel under consideration.

The output of the input buffer 401 is coupled to the gradient module 402 and the estimation module 404. The gradient module 402 calculates a set of gradients corresponding to different directions within the neighborhood of CFA raw image data. In a preferred embodiment, the gradients are determined for eight directions comprising of North (N), Northwest (NW), Northeast (NE), South (S), Southwest (SW), Southeast (SE), West (W) and East (E) directions. In another preferred embodiment, the demosaic module 305 only uses the six most significant bits (MSB) of the ten-bit image data passed from the Input Module 301. Using only the six MSB saves computational costs.

The gradient module 402 is further coupled to the threshold module 404. The threshold module 404 determines a threshold value. The threshold value is used to select a subset of gradients from the set of gradients that fall below the threshold value.

The output of the threshold module 404 is coupled to an input of the estimation module 404. The estimation module 404 takes the actual measured, pixel data from the input buffer 401 and calculates estimations for the missing color and the center pixel on directions that are within the subset of gradients below the threshold value. The estimation module 404 then calculates the sum of the estimation values for the missing color and the sum of the estimation values for the center pixel on all directions that are within the subset of gradients below the threshold value. The estimation module 404 is further coupled to the color interpolation module 405. The color interpolation module 405 interpolates the missing color value by using the average difference of the summed estimation values for the missing color and the summed estimation values for the centered pixel under consideration, and adding that value to the actual measured center pixel value. The missing color value is outputted to the output buffer 406.

Figure 5:
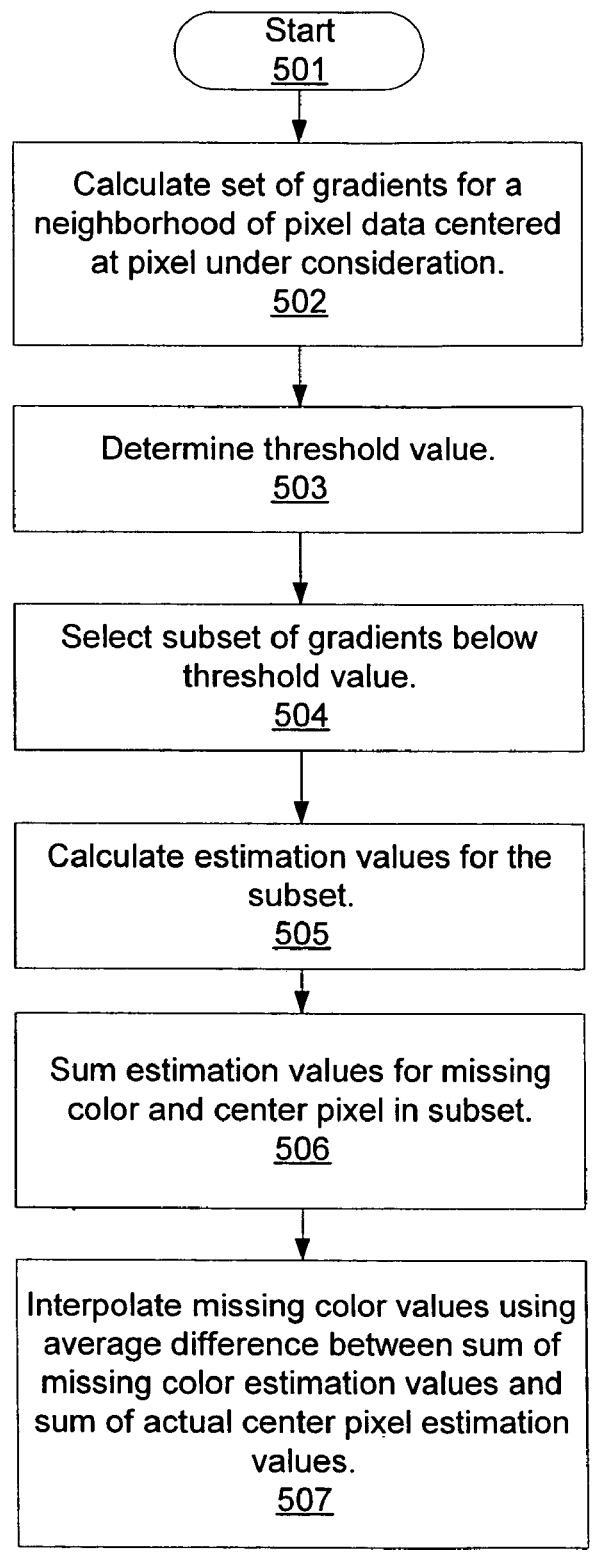
FIG. 5 is a flowchart illustrating the steps for the demosaic method performed by a demosaic module of FIG. 4.

FIG. 5 is a flowchart illustration of the preferred method for the demosaic process. The demosiac module 305 interpolates the missing color values for a pixel on a CFA by considering a neighborhood of CFA pixels, as provided by the input buffer 401, centered at the pixel under consideration 502. In the preferred embodiment a 5×5 neighborhood is chosen. However, one skilled in the art will recognize that a smaller or larger neighborhood may be selected. The gradient module 402 calculates the gradients 502 for eight different directions comprising of the N, NW, NE, S, SW, SE, W and E directions on the 5×5 neighborhood. Next, the threshold module 403 determines the threshold value, step 503, and the threshold module 403 selects a subset of gradients below the threshold value, step 504. The estimation module 404 then calculates estimation values for each color on a direction in the subset, step 505. The estimation module 404 then sums these estimation values for all directions within the subset for the missing color and the center pixel 506. Next, the color interpolation module 405 interpolates a missing color value by considering the average difference of the sum of the missing color estimation values and sum of the center pixel estimation values, step 507.

Referring now to FIGS. 6A-6D and 7A-7D, there are shown 5×5 CFA patterns for sensor RGB Bayer patterns and sensor CMYG patterns. The RGB Bayer CFA is periodic with a period of two in both the vertical and horizontal directions, and thus, there are four separate cases as shown in FIGS. 6A-6D. Similarly, the CMYG CFA can also be arranged into four separate cases corresponding to the Bayer patterns, as illustrated in FIGS. 7A-7D.

The demosaic process treats the Bayer patterns as four separate colors so as to support CMYG patterns inherently. Since a Bayer pattern is periodic with a period of two, any Bayer pattern (as illustrated in FIGS. 6A-6D) can be represented using four separate colors, A, B, C and D, in alternating color patterns as illustrated in FIG. 8. We can use this same pattern (i.e., FIG. 8) to represent CMYG CFA. Each color pixel, A, B, C or D in FIG. 8, corresponds to the color pixel on the same location of the Bayer or CMYG pattern. Thus, the color pixel on the Bayer or CMYG pattern is mapped to the color pixel representation on the 5×5 matrix of FIG. 8. For example, $A_{i-2, j-2}$ can correspond to Gb in FIG. 6A, Gr in FIG. 6B, R in FIG. 6C, B in FIG. 6D, C in FIG. 7A, G in FIG. 7B, Y in FIG. 7C, or M in FIG. 7D, depending on the CFA pattern that is used in the sensor. Thus, the demosaic module 305 can apply the same edge adaptive demosaic process to both Bayer sensor images and CMYG sensor images in order to recover their respective full-color images. In this mapping, the center pixel is the pixel under consideration. $A_{i, j}$ represents the actual measured center pixel color from the CFA sensor image data, and the process is used to determine the other color values (i.e., the missing color values) for the center pixel, i.e., the values for $B_{i, j}$, $C_{i, j}$, and $D_{i, j}$. $B'_{i, j}$, $C'_{i, j}$, and $D'_{i, j}$ represent the interpolated (estimated) missing color values determined by the process.

Now referring again to FIG. 8, here is described the method of performing the demosaic operation according to an embodiment of the present invention. First, the demosaic module 305 determines a set of gradients that will indicate the similarity between the center pixel under consideration, $A_{i,j}$, and the surrounding pixels in each direction using a set of eight directions: North (N), Northeast (NE), East (E), Southeast (SE), South (S), Southwest (SW), West (W) and Northwest (NW). The gradient for each direction is determined by summing the absolute values of the differences between pairs of similar-colored pixels as follows:

$$G(N,i,j)=abs(A_{i-2,j}-A_{i,j})+abs(B_{i-2,j-1}-B_{i,j-1})/2+\\abs(B_{i-2,j+1}-B_{i,j+1})/2+abs(C_{i-1,j}-C_{i+1,j})+\\abs(D_{i-1,j-1}-D_{i+1,j-1})/2+abs(D_{i-1,j+1}-D_{i+1,j+1})/2$$

$$G(S,i,j)=abs(A_{i+2,j}-A_{i,j})+abs(B_{i+2,j-1}-B_{i,j-1})/2+\\abs(B_{i+2,j+1}-B_{i,j+1})/2+abs(C_{i-1,j}-C_{i+1,j})+\\abs(D_{i-1,j-1}-D_{i+1,j-1})/2+abs(D_{i-1,j+1}-D_{i+1,j+1})/2$$

$$G(W,i,j)=abs(A_{i,j-2}-A_{i,j})+abs(C_{i-1,j-2}-C_{i-1,j})/2+\\abs(C_{i+1,j-2}-C_{i+1,j})/2+abs(B_{i,j-1}-B_{i,j+1})+\\abs(D_{i-1,j-1}-D_{i-1,j+1})/2+abs(D_{i+1,j-1}-D_{i+1,j+1})/2$$

$$G(E,i,j)=abs(A_{i,j+2}-A_{i,j})+abs(C_{i-1,j+2}-C_{i-1,j})/2+\\abs(C_{i+1,j+2}-C_{i+1,j})/2+abs(B_{i,j-1}-B_{i,j+1})+\\abs(D_{i-1,j-1}-D_{i-1,j+1})/2+abs(D_{i+1,j-1}-D_{i+1,j+1})/2$$

$$G(NE,i,j)=abs(A_{i-2,j+2}-A_{i,j})+abs(B_{i-2,j+1}-B_{i,j-1})/2+\\abs(B_{i,j+1}-B_{i+2,j-1})/2+abs(D_{i-1,j+1}-D_{i+1,j-1})+\\abs(C_{i-1,j}-C_{i+1,j-2})/2+abs(C_{i-1,j+2}-C_{i+1,j})/2$$

$$G(NW,i,j)=abs(A_{i-2,j-2}-A_{i,j})+abs(B_{i-2,j-1}-B_{i,j+1})/2+\\abs(B_{i,j-1}-B_{i+2,j+1})/2+abs(D_{i-1,j-1}-D_{i+1,j+1})+\\abs(C_{i-1,j-2}-C_{i+1,j})/2+abs(C_{i-1,j}-C_{i+1,j+2})/2$$

$$G(SE,i,j)=abs(A_{i+2,j+2}-A_{i,j})+abs(B_{i-2,j-1}-B_{i,j+1})/2+\\abs(B_{i,j-1}-B_{i+2,j+1})/2+abs(D_{i-1,j-1}-D_{i+1,j+1})+\\abs(C_{i-1,j-2}-C_{i+1,j})/2+abs(C_{i-1,j}-C_{i+1,j+2})/2$$

$$G(SW,i,j)=abs(A_{i+2,j-2}-A_{i,j})+abs(B_{i-2,j+1}-B_{i,j-1})/2+\\abs(B_{i,j+1}-B_{i+2,j-1})/2+abs(D_{i-1,j+1}-D_{i+1,j-1})+\\abs(C_{i-1,j}-C_{i+1,j-2})/2+abs(C_{i-1,j+2}-C_{i+1,j})/2$$

G(d, i, j) is a function of gradient at spatial position (i, j) and direction d where d={N=1, S=7, W=3, E=5, NE=2, NW=0, SE=8, SW=6}.

There is an estimate, E(d, c, i, j), for each color c on direction d at (i, j), where c belongs to {A, B, C, D}. For example, $E(N, A, i, j)=(A_{i-2, j}+A_{i, j})/2$ and $E(SE, C, i, j)=(C_{i+1,j+2}+C_{i+1, j})/2$. Table 1 lists values for E(d, c, i, j) for each color c on direction d at (i, j).

TABLE 1

| | A | B | C | D |
|---|---|---|---|---|
| N | $(A_{i-2,j} + A_{i,j})/2$ | $(B_{i-2,j-1} + B_{i-2,j+1} + B_{i,j+1} + B_{i,j-1})/4$ | $C_{i-1,j}$ | $(D_{i-1,j-1} + D_{i-1,j+1})/2$ |
| S | $(A_{i+2,j} + A_{i,j})/2$ | $(B_{i+2,j-1} + B_{i+2,j+1} + B_{i,j+1} + B_{i,j-1})/4$ | $C_{i+1,j}$ | $(D_{i+1,j-1} + D_{i+1,j+1})/2$ |
| E | $(A_{i,j+2} + A_{i,j})/2$ | $B_{i,j+1}$ | $(C_{i-1,j+2} + C_{i+1,j+2} + C_{i-1,j} + C_{i+1,j})/4$ | $(D_{i+1,j+1} + D_{i-1,j+1})/2$ |
| W | $(A_{i,j-2} + A_{i,j})/2$ | $B_{i,j-1}$ | $(C_{i-1,j-2} + C_{i+1,j-2} + C_{i-1,j} + C_{i+1,j})/4$ | $(D_{i-1,j-1} + D_{i+1,j-1})/2$ |
| NE | $(A_{i-2,j+2} + A_{i,j})/2$ | $(B_{i-2,j+1} + B_{i,j+1})/2$ | $(C_{i-1,j} + C_{i-1,j+2})/2$ | $D_{i-1,j+1}$ |

TABLE 1-continued

| | A | B | C | D |
|---|---|---|---|---|
| NW | $(A_{i-2,j-2} + A_{i,j})/2$ | $(B_{i-2,j-1} + B_{i,j-1})/2$ | $(C_{i-1,j-2} + C_{i-1,j})/2$ | $D_{i-1,j-1}$ |
| SE | $(A_{i+2,j+2} + A_{i,j})/2$ | $(B_{i,j+1} + B_{i+2,j+1})/2$ | $(C_{i+1,j+2} + C_{i+1,j})/2$ | $D_{i+1,j+1}$ |
| SW | $(A_{i+2,j-2} + A_{i,j})/2$ | $(B_{i,j-1} + B_{i+2,j-1})/2$ | $(C_{i+1,j-2} + C_{i+1,j})/2$ | $D_{i+1,j-1}$ |

Now, a threshold $T(i, j)$ needs to be determined and a subset of gradient below this threshold is selected. The threshold is defined as $T(i, j)=k_1*G_{min}(i, j)+k_2*(G_{max}(i, j)-G_{min}(i, j))$. $G_{min}(i, j)$ is the minimum gradient value in the set, that is, $G_{min}(i, j)=Min(G(d, i, j))$. Similarly, $G_{max}(i, j)$ is the maximum gradient value in the set, where $G_{max}(i, j)=Max(G(d, i, j))$.

$k_1*G_{min}(i, j)$ is the case where the gradient are very similar, and thus $k_1$ is specified to be greater than 1. In a preferred embodiment, a value of $k_1=1.5$ is empirically determined to give good results. $k_2*(G_{max}(i, j)-G_{min}(i, j))$ accounts for the situation where this is a significant difference between the max and min gradient values. Here, $k_2$ is set to a cutoff, and in a preferred embodiment, a value of $k_2=0.5$ is empirically determined to give good results.

Next, we define a set of directions $D_s$ which is smooth. We define this set of directions by taking a subset of the gradients such that all gradients in the subset are less than $T(i, j)$. That is, we let $D_s=\{d|G(d, i, j)<T(i, j)\}$ and define $N(D_s)$ as the number of elements in set $D_s$.

Finally, we can calculate the interpolated value for each missing color:

$$A'(i, j) = A_{i,j},$$

$$B'(i, j) = A'(i, j) + \left(\sum_{d \in Ds} E(d, B, i, j) - \sum_{d \in Ds} E(d, A, i, j)\right) / N(Ds)$$

$$C'(i, j) = A'(i, j) + \left(\sum_{d \in Ds} E(d, C, i, j) - \sum_{d \in Ds} E(d, A, i, j)\right) / N(Ds)$$

$$D'(i, j) = A'(i, j) + \left(\sum_{d \in Ds} E(d, D, i, j) - \sum_{d \in Ds} E(d, A, i, j)\right) / N(Ds)$$

Note that in calculating the value of each missing color, we only sum the values for $E(d, c, i, j)$ where each d is an element of the subset $D_s$.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A demosaic system for converting a sensor image into a full-color image comprising:
    a gradient module for calculating a plurality of gradients from a neighborhood of the sensor image data centered at a pixel under consideration, wherein a gradient corresponds to a direction;
    a threshold module for determining a threshold value and selecting a subset of gradients from the plurality of gradients below the threshold value;
    an estimation module for calculating an estimation value from the sensor image data for a missing color and an estimation value for a center pixel on a direction in the plurality of gradients and for calculating a sum of a missing color estimation value and a sum of a center pixel estimation value; and
    a color interpolation module for interpolating a missing color value using an average difference between the sum of the missing color estimation value and the sum of the center pixel estimation value.

2. The demosaic system of claim 1, wherein the neighborhood of the sensor image data comprises a 5×5 array of adjacent pixels centered at the pixel under consideration.

3. The demosaic system of claim 1, wherein the threshold module determines the threshold according to the equation $ki*G_{min}(i, j)+k2*(Gmax(i, j)-Gmin(i, j))$, wherein k1 and k2 are constants and Gram(i, j) is the minimum gradient value in the set of gradients and Gmax(i, j) is the maximum gradient value in the plurality of gradients.

4. The demosaic system of claim 3, wherein k1 is greater than 1 and k2 is less than 1.

5. The demosaic system of claim 4, wherein k1=1.5 and k2=0.5.

6. The demosaic system of claim 1, wherein the sensor pixel data is mapped to four separate colors in alternating patterns in a matrix representation centered at the pixel under consideration.

7. The demosaic system of claim 6, wherein the matrix representation is a 5×5 matrix centered at the pixel under consideration.

8. The demosaic system of claim 1, wherein the plurality gradients is determine from eight directions comprising of the north, northwest, northeast, south, southwest, southeast, west and east directions.

9. The demosaic system of claim 1, wherein the missing color value is calculated by adding an actual measured center pixel color value to the average difference of the sum of the missing color estimation values and the sum of the center pixel estimation values.

10. The demosaic system of claim 1, wherein the average difference is determined by dividing the difference of the sum of the missing color estimation values and the sum of the center pixel estimation values by the number of elements in the subset of gradients.

11. The demosaic system of claim 1, wherein the gradient for each direction is determine determined by summing the absolute value of differences between pairs of similar-colored pixels.

12. The demosaic system of claim 1, wherein the sensor image data comprises an RGB Bayer pattern.

13. The demosaic system of claim 1, wherein the sensor image data comprises a CMYG pattern.

14. A method for performing a demosaic operation on a sensor image data comprising:
    calculating a plurality of gradients from a neighborhood of the sensor image data centered at a pixel under consideration, wherein a gradient corresponds to a direction;
    determining a threshold value;
    selecting a subset of gradients from the plurality of gradients below the threshold value;
    calculating an estimation value from the sensor image data for a missing color and an estimation value for a center pixel on a direction in the plurality of gradients;
    calculating a sum of a missing color estimation value and a sum of a center pixel estimation value; and interpolating a missing color value using an average difference between the sum of the missing color estimation value and the sum of the center pixel estimation value.

15. The method of claim 14, wherein an RGB sensor image data is inherently supported.

16. The method of claim 14, wherein a CMYG sensor image data is inherently supported.

17. A method for performing a demosaic operation on a sensor image data comprising:

representing the sensor image data using a plurality of color data in alternating patterns in a matrix representation centered at a pixel under consideration;

calculating as a plurality of gradients for the plurality of color data centered at the pixel under consideration, wherein a gradient corresponds to a direction;

determining a threshold value;

selecting a subset of gradients from the plurality of gradients below the threshold value;

calculating an estimation value from the plurality of color data for a missing color and an estimation value for a center pixel on a direction in the subset of gradients;

calculating a sum of a missing color estimation value and a sum of a center pixel estimation value; and interpolating a missing color value using an average difference between the sum of the missing color estimation value and the sum of the center pixel estimation value.

18. The demosaic method of claim 17, wherein the plurality of colors comprises four separate colors.

19. The demosaic method of claim 17, wherein the sensor image data is an RGB Bayer pattern.

20. A method for processing sensor image data to recover full color image data, comprising:

retrieving the sensor image data stored in a memory;

using a gradient function, calculating a plurality of gradients from a neighborhood of the sensor image data centered at a pixel under consideration, wherein a gradient corresponds to a direction;

using a threshold function, determining a threshold value and selecting a subset of gradients from the plurality of gradients below the threshold value;

using an estimation function, calculating an estimation value from the sensor image data for a missing color and an estimation value for a center pixel on a direction in the subset of gradients and calculating a sum of a missing color estimation value and a sum of a center pixel estimation value; and using a color interpolation function, interpolating a missing color value using an average difference between the sum of the missing color estimation value and the sum of the center pixel estimation value.

21. The method of claim 20, wherein the sensor image data is an RGB Bayer pattern.

22. The method of claim 20, wherein the sensor image data is a CMYG pattern.

* * * * *

UNITED STATES PATENT AND TRADEMARK OFFICE
CERTIFICATE OF CORRECTION

PATENT NO. : 7,333,678 B1  Page 1 of 1
APPLICATION NO. : 10/850778
DATED : February 19, 2008
INVENTOR(S) : Qifan Huang and Li Sha It is certified that error appears in the above-identified patent and that said Letters Patent is hereby corrected as shown below:

In column 6 lines 54-60 replace "threshold module 404" with --threshold module 403-- in three instances.

Signed and Sealed this

Twenty-seventh Day of May, 2008

JON W. DUDAS
*Director of the United States Patent and Trademark Office*